United States Patent [19]

Fukumoto et al.

[11] Patent Number: 5,096,995
[45] Date of Patent: Mar. 17, 1992

[54] POLYETHER-ESTER AMIDE AND PERMANENTLY ANTISTATIC RESIN COMPOSITION

[75] Inventors: Tadao Fukumoto, Tsushima; Kazuhisa Yano, Nagoya; Masatoshi Iwamoto, Aichi, all of Japan

[73] Assignee: Toray Industries, Inc., Japan

[21] Appl. No.: 230,382

[22] Filed: Aug. 9, 1988

[30] Foreign Application Priority Data

Aug. 13, 1987 [JP] Japan ................... 62-202122
Aug. 13, 1987 [JP] Japan ................... 62-202123

[51] Int. Cl.$^5$ ............................................. C08L 77/12
[52] U.S. Cl. ...................................... 528/125; 528/171; 528/172; 528/173; 528/174; 528/176; 528/183; 528/184; 528/185; 528/190; 528/193; 528/194; 528/195; 525/66
[58] Field of Search ............... 528/280, 125, 177, 172, 528/173, 174, 176, 183, 184, 185, 190, 193, 194, 195

[56] References Cited

U.S. PATENT DOCUMENTS 4,182,842 1/1980 Jackson et al. .................. 528/292
4,716,198 12/1987 Murabayashi .................... 525/92

FOREIGN PATENT DOCUMENTS 167824 1/1986 European Pat. Off. .
60-23435 2/1985 Japan .

*Primary Examiner*—Ana L. Carrillo
*Attorney, Agent, or Firm*—Austin R. Miller

[57] ABSTRACT

A transparent polyether-ester amide having a permanently antistatic property is obtained by copolymerizing (a) an aminocarboxylic acid, a lactam, or a salt derived from a diamine and a dicarboxylic acid; (b) a diol of the formula:

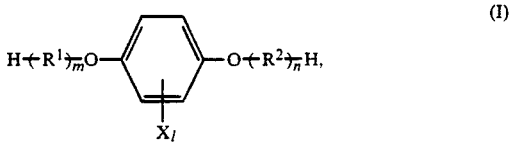

(I)

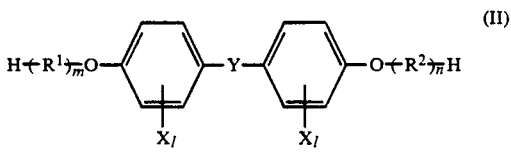

(II)

and

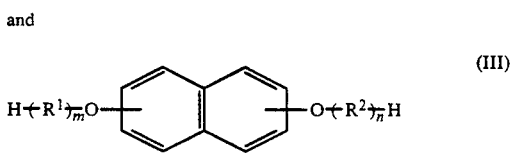
(III)

wherein $R^1$ and $R^2$ are an ethylene oxide or propylene oxide group, Y is covalent bond, alkylene, alkylidene, cycloalkylidene, arylalkylidene, O, SO, $SO_2$, CO, S, $CF_2$, $C(CF_3)_2$ or NH, X is H, alkyl, halogen, sulfonic acid or salt thereof, l is 0 or an integer of 1-4, and m and n an integer of 1-15; (c) a poly(alkylene oxide)glycol or a diol of the formula:

$$HO-R^3-OH \qquad (IV)$$

wherein $R^3$ is alkylene, alkylidene, cycloalkylidene or arylalkylidene; and (d) a dicarboxylic acid; wherein the content of the polyether-ester units is 10 to 90 wt. %. The polyether-ester amide is used preferably as a blend thereof with a graft copolymerization product formed by graft-polymerizing (a) a rubbery polymer with (b) a monomer mixture of a methacrylic or acrylic acid ester, an aromatic vinyl monomer and an optional vinyl cyanide monomer, this product having a refractive index approximately similar to that of the polyether-ester amide.

9 Claims, No Drawings

POLYETHER-ESTER AMIDE AND PERMANENTLY ANTISTATIC RESIN COMPOSITION

BACKGROUND OF THE INVENTION (1) Field of the Invention

This invention relates to a polyether-ester amide and a transparent thermoplastic resin having a permanently antistatic property.

(2) Description of the Related Art

A polyether-ester amide synthesized from an amide-forming component, a poly(alkylene oxide) glycol component and a dicarboxylic acid component is widely used industrially as a thermoplastic elastic molding material. This polyether-ester amide is disclosed, for example, in U.S. Pat. No. 3,044,987 and U.S. Pat. No. 3,455,734. This polyether-ester amide is crystal-line and is not a polymer having a good transparency.

Polycarbonates and polymethacrylates are known as transparent resins. However, the technique of destaticizing polycarbonates has not been established. The technique of destaticizing polymethacrylates is known but is not widely used because the treatment is very expensive.

A resin comprising a rubbery polymer and a matrix resin, in which the refractive indexes of rubbery polymer and matrix resin substantially agree, for example, a methyl methacrylate/butadiene/styrene copolymer (MBS resin) or a methyl methacrylate/acrylonitrile/-butadiene/styrene copolymer (MABS resin), is widely used in various fields as a resin having an excellent impact resistance and transparency. Resins of this type have excellent mechanical strengths and optical characteristics but they have a poor antistatic property. Therefore, utilization of these resins for IC carrier cases and OA device covers in which prevention of static is desired, and for various dust-proof articles and parts is difficult.

As a process for destaticizing a transparent resin, a process is known in which a hydrophilic rubbery polymer formed by copolymerizing a conjugated diene and/or an alkyl ester of acrylic acid with a vinyl monomer having an alkylene oxide group is graft-polymerized with a vinyl monomer, the graft chain having substantially the same refractive index as that of the polymer (see, for example, Japanese Unexamined Patent Publication No. 55-36,237). Although a practical antistatic effect can be attained according to this process, the process still has a problem in that since a special hydrophilic rubbery polymer is used, preparation is complicated, and the obtained resin has poor mechanical characteristics such as impact resistance and elastic modulus.

SUMMARY OF THE INVENTION

It is a primary object of the present invention to provide a polyether-ester amide having an excellent transparency that is not degraded with the lapse of time or by the heat aging, and excellent mechanical strengths.

Another object of the present invention is to provide an antistatic thermoplastic resin composition having a high permanent antistatic effect, a high impact resistance and a high transparency.

In accordance with one aspect of the present invention, there is provided a transparent polyetherester amide which is formed by copolymerizing (a) an aminocarboxylic acid having at least 6 carbon atoms, a lactam having at least 6 carbon atoms or a salt having at least 6 carbon atoms, which is synthesized from a diamine and a dicarboxylic acid, (b) at least one diol compound selected from the group consisting of compounds represented by the following formulae (I) through (III):

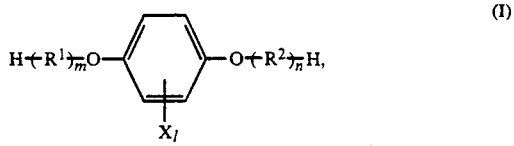

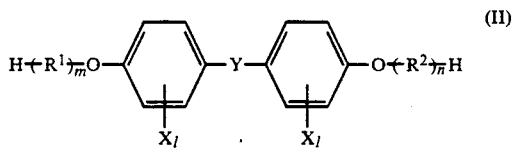

and

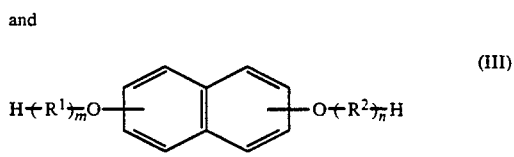

wherein $R^1$ and $R^2$ independently stand for at least one member selected from the group consisting of an ethylene oxide group and a propylene oxide group, Y stands for a covalent bond, an alkylene group having 1 to 6 carbon atoms, an alkylidene group, a cycloalkylidene group, an arylalkylidene group, O, SO, $SO_2$, CO, S, $CF_2$, $C(CF_3)_2$ or NH, X stands for hydrogen, an alkyl group having 1 to 6 carbon atoms, a halogen a sulfonic acid or a salt thereof, l is 0 or an integer of from 1 to 4, and m and n stand for an integer of from 1 to 15, (c) at least one diol compound selected from the group consisting of a poly(alkyleneoxide)glycol and a diol represented by the following general formula (IV):

$$HO—R^3—OH \qquad (IV)$$

wherein $R^3$ stands for an alkylene, alkylidene, cycloalkylidene or arylalkylidene group having 2 to 16 carbon atoms, and (d) a dicarboxylic acid having 4 to 20 carbon atoms, wherein the content of the polyether-ester units is 10 to 90% by weight.

In accordance with another aspect of the present invention, there is provided a transparent thermoplastic resin composition comprising (A) 1 to 40% by weight of the above-mentioned transparent polyether-ester amide, and (B) 99 to 60% by weight of a graft copolymerization product formed by graft-polymerizing (a) 1 to 80 parts by weight of a rubbery polymer with (b) 99 to 20 parts by weight of a monomer mixture comprising 100 to 40% by weight of an aromatic vinyl monomer and at least one monomer selected from a methacrylic acid ester and acrylic acid ester, and 0 to 60% by weight of a vinyl cyanide monomer, wherein the difference of the refractive index between the components (A) and (B) is not larger than 0.02.

DESCRIPTION OF THE PREFERRED EMBODIMENTS

The component (a) of the polyether-ester amide (A) is a polyamide-forming component of the polyether-ester amide, which is selected from an aminocarboxylic acid having at least 6 carbon atoms, a lactam having at least 6 carbon atoms and a salt having at least 6 carbon atoms, which is synthesized from a diamine and a dicarboxylic acid.

As the aminocarboxylic acid, there can be mentioned ω-aminocaproic acid, ω-aminoenanthic acid, ω-aminocaprylic acid, ω-aminopelargonic acid, ω-aminocapric acid, 11-aminoundecanoic acid and 12-aminododecanoic acid. As the lactam, there can be mentioned caprolactam, enantholactam, caprylolactam and laurolactam. As the diamine, there can be mentioned hexamethylenediamine. As the dicarboxylic acid, there can be mentioned adipic acid, sepacic acid, decanedicarboxylic acid and isophthalic acid. As the dimanine/dicarboxylic acid salt, there can be mentioned hexamethylene-diamine adipate, hexamethylene-diamine sebacate, hexamethylenediamine decanedicarboxylate and hexamethylene-diamine isophthalate. Caprolactam, 11-aminoundecanoic acid, 12-aminododecanoic acid and hexamethylene-diamine adipate are especially preferred as the component (a) of the polyether-ester amide.

The above-mentioned component (a), that is, an aminocarboxylic acid having at least 6 carbon atoms, a lactam having at least 6 carbon atoms or a salt having at least 6 carbon atoms, which is synthesized from a diamine and a dicarboxylic acid, is used in an amount such that the content is 10 to 90% by weight, preferably 20 to 80% by weight, based on the weight of the polyether-ester amide. If the content of the component (a) is lower than 10% by weight, the mechanical properties of the polyether-ester amide are not satisfactory and if the content of the component (a) exceeds 90% by weight, the transparency of the polyether-ester amide is poor.

The diol compound (b) used for the preparation of the polyether-ester amide (A) of the present invention is selected from compounds represented by the following formulae (I) through (III):

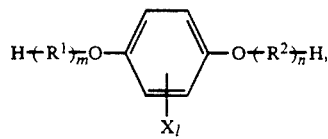
(I)

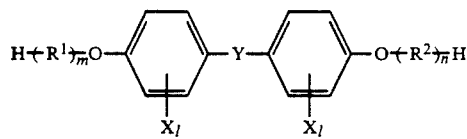
(II)

and

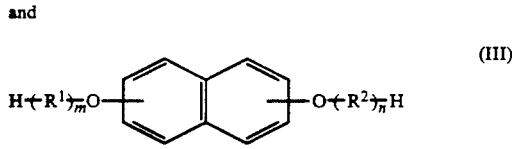
(III)

wherein $R^1$ and $R^2$ independently stand for at least one member selected from the group consisting of an ethylene oxide group and a propylene oxide group, Y stands for a covalent bond, an alkylene group having 1 to 6 carbon atoms, an alkylidene group having 1 to 6 carbon atoms, a cycloalkylidene group having 7 to 17 carbon atoms, an arylalkylidene group having 7 to 17 carbon atoms, O, SO, $SO_2$, CO, S, $CF_2$, $C(CF_3)_2$ or NH, X stands for hydrogen, an alkyl group having 1 to 6 carbon atoms, a halogen, a sulfonic acid or a salt thereof, l is 0 or an integer of from 1 to 4, and m and n stand for an integer of from 1 to 15.

In the compounds represented by the general formulae (I) through (III), in view of the polymerizability. Preferably at least one of $R^1$ and $R^2$ is an ethylene oxide group. Furthermore, if m and n stand for an integer of from 1 to 15, a good antistatic property and a good transparency are attained, and if m and n stand for an integer of from 1 to 5, an especially high transparency is attained. From the viewpoint of the polymerizability and transparency, compounds represented by the general formula (II) are preferred.

As specific examples of the diol compound (b), there can be mentioned an ethylene oxide and/or propylene oxide adduct of bisphenol A, an ethylene oxide and/or propylene oxide adduct of tetrabromobisphenol A, an ethylene oxide and/or propylene oxide adduct of dimethylbisphenol A, an ethylene oxide and/or propylene oxide adduct of tetramethylbisphenol A, an ethylene oxide and/or propylene oxide adduct of 2,2-bis(sodium 4,4,-hydroxyphenyl-3,3,-sulfonate)propane, an ethylene oxide and/or propylene oxide adduct of bisphenol S, an ethylene oxide and/or propylene oxide adduct of dimethylbisphenol S, an ethylene oxide and/or propylene oxide of tetramethylbisphenol S, an ethylene oxide and/or propylene oxide adduct of 4,4,-(hydroxy)bisphenyl, an ethylene oxide and/or propylene oxide adduct of bis(4-hydroxyphenyl)sulfide, an ethylene oxide and/or propylene oxide adduct of bis(4-hydroxyphenyl)sulfoxide, an ethylene oxide and/or propylene oxide adduct of bis(4-hydroxyphenyl)difluoromethane, an ethylene oxide and/or propylene oxide adduct of bis(4-hyroxyphenyl-)difluoromethane, an ethylene oxide and/or propylene oxide adduct of bis(4-hydroxyphenyl)hexafluoropropane, an ethylene oxide and/or propylene oxide adduct of bis(4-hydroxyphenyl)ether, an ethylene oxide and/or propylene oxide adduct of bis(4-hydroxyphenyl)amine, an ethylene oxide and/or propylene oxide adduct of 2,2-bis(4-hydroxyphenyl)ethane, an ethylene oxide and/or propylene oxide adduct of 1,1-bis(4-hydroxyphenyl)cyclohexane, an ethylene oxide and/or propylene oxide adduct of 4,4,-dihydroxybenzophenone, an ethylene oxide and/or propylene oxide adduct of hydroquinone, an ethylene oxide and/or propylene oxide adduct of sodium 1,4-dihydroxybenzene-sulfonate, an ethylene oxide and/or propylene oxide adduct of dihydroxynaphthalene, and block copolymers thereof.

An ethylene oxide adduct of hydroquinone, an ethylene oxide adduct of bisphenol A, an ethylene oxide adduct of bisphenol S, an ethylene oxide adduct of dihydroxyphthalene and block copolymers thereof are preferred as the diol compound, and in view of the polymerizability and from the economical viewpoint, an ethylene oxide adduct of bisphenol A and a block copolymer thereof are especially preferred.

These diol compounds (b) can be used singly or in the form of a mixture of two or more thereof. The copolymerization ratio of the diol compound (b) is not particularly critical, but in view of the transparency, antistatic effect and tensile characteristics, preferably the content of the diol compound (b) is 0.1 to 60% by weight based of the polyether-ester units.

The diol compound (c) used for the preparation of the polyether-ester amide (A) of the present invention is a poly(alkylene oxide)glycol and/or a diol compound represented by the formula (IV):

$$HO-R^3-OH \quad (IV)$$

wherein $R^3$ stands for an alkylene, alkylidene, cycloalkylidene or arylalkylidene group having 2 to 16 carbon atoms.

As specific examples of the diol compound(c), there can be mentioned ethylene glycol, 1,3-propanediol, 1,2-propanediol, 1,4-butanediol, 1,6-hexanediol, 1,10-decanediol, neopentyl glycol, 1,2-cyclohexanediol, 1,3-cyclohexanediol, 1,4-cyclohexanediol, 1,4-cyclohexanedimethanol, 1,3-cyclohexanedimethanol, p-xylylene glycol, m-xylylene glycol, polyethyleneglycol, poly(1,2-propylene oxide)glycol, poly(1,3-prop-ylene oxide)glycol, poly(tetramethylene oxide)glycol, poly(hexamethylene oxide)glycol, ethylene oxide/propylene oxide block or random copolymers, and ethylene oxide/tetrahyirofuran block or random copolymers. Among them, poly(alkylene oxide)glycols such as polyethyleneglycol, poly(propylene oxide)glycol and poly(tetramethylene oxide)glycol, p-xylylene glycol and 1,4-cyclohexanedimethanol are preferably used. Polyethylene glycol and poly(propylene oxide)glycol are especially preferred because the resulting polyether-ester amide has excellent hydrophylic property and antistatic effect. From the viewpoint of the polymerizability and antistatic effect, use of polyethylene-glycol is particularly especially preferred. Moreover, poly(alkylene oxide)glycols having number average molecular weight of 200 to 6,000, especially 200 to 4,000, are preferred because of the high transparency and excellent antistatic effect obtained therefrom. If the number average molecular weight is lower than 200, the mechanical properties of the obtained polyether-ester amide are not satisfactory, and if the number average molecular weight exceeds 4,000, the transparency of the polyether-ester amide is poor.

As the dicarboxylic acid (d) having 4 to 20 carbon atoms, which forms polyether-ester amide units together with the diol components (b) and (c), there can be mentioned aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid and sodium 3-sulfoisophthalate; alicyclic dicarboxylic acids such as 1,4-cyclohexanedicarbox-vlic acid, 1,2-cyclohexanedicarboxylic acid and dicyclohexyl-4,4'-dicarboxylic acid; and aliphatic dicarboxylic acids such as succinic acid, oxalic acid, adipic acid, sebacic acid and dodecanedioic acid (decanedicarboxylic acid). In view of the polymerizability, hue, transparency and physical properties, terephthalic acid, isophthalic acid, 1,4-cyclohexanedicarboxylic acid, sebacic acid, adipic acid and decanedicarboxylic acid are preferably used.

The diol compound (b) and the diol compound (c) are reacted with the dicarboxylic acid (d) at a molar ratio of 1/1, but these components are supplied at a charge molar ratio of 1/1 or the charge molar ratio is appropriately changed from 1/1 according to the kind of the dicarboxylic acid used. The content of the polyether-ester derived from the components (b), (c) and (d) is 10 to 99% by weight, preferably 20 to 80% by weight, especially preferably 30 to 70% by weight, based on the polyether-ester amide. If the content of the polyether-ester is lower than 10% by weight, the transparency of the polyether-ester amide is not satisfactory, and if the content of the polyether-ester ester exceeds 90% by weight, the mechanical properties of the polyether-ester amide are poor.

By appropriately selecting the polymerization components and composition, a transparent polyetheresteramide having a low crystallinity can be obtained.

The polymerization process for the preparation of the polyether-ester amide of the present invention is not particularly critical. For example, there can be adopted (1) a process in which the component (a), that is, an aminocarboxylic acid having at least 6 carbon atoms, a lactam having at least 6 carbon atoms or a salt having at least 6 carbon atoms, which is synthesized from a diamine and a dicarboxylic acid, is reacted with the dicarboxylic acid (d) to form a polyamide prepolymer having carboxylic acid terminal groups. The average molecular weight of this polyamide prepolymer can be changed in a broad range, but an average molecular weight of 300 to 15,000, especially 500 to 5,000, is preferred, and the so-formed polyamide prepolymer is reacted with the diol compound (b) and the diol compound (c) under vacuum; (2) a process in which the above-mentioned components (a), (b), (c) and (d) are charged in a reactor, they are reacted at a high temperature under a high pressure in the presence or absence of water to form an carboxylic acid-terminated polyamide prepolymer and reaction is further advanced under normal pressure or under vacuum, and (3) a process in which the components (a), (b), (c) and (d) are charged in a reactor, the mixture is heated and stirred in an $N_2$ current to form a transparent homogeneous liquid mixture, and reaction is advanced under vacuum. The term "under vacuum" as used herein denotes that the reaction is carried out under a pressure lower than about 15 mmHg, preferably lower than 5 mmH, especially preferably lower than 1 mmHg.

In the polymerization reaction for formation of the polyether-ester amide, there are preferably used titanium catalysis such as tetraalkyl titanates, for example, tetrabutyl titanate, and titanium metal salts of oxalic acid, for example, potassium titanium oxalate; tin catalysts such as dibutyltin oxide, dibutyltin laurate and monobutyltin oxide; zirconium tetraalkoxide catalysts such as zirconium tetrabutoxide an zirconium isopropoxide; hafnium tetraalkoxide catalysts such as hafnium tetraethoxide; lead catalysts such as lead acetate; germanium catalysts such as germanium oxide; and mixtures of the foregoing catalysts with antimony catalysts such as antimony trioxide, but the kind of the catalyst is not particularly critical.

If the hue is changed according to the polymerization conditions, the polyether-ester amide can be stabilized by incorporation of a small amount of a phosphorus compound, for example, trimethyl phosphate.

A polyfunctional compound such as trimesic acid, glycerol or pentaerythritol may be incorporated in the polymerization reaction mixture, so long as gelation does not occur. This polyfunctional compound can be utilized as a viscosity increaser.

The time required for the polycondensation is 30 minutes to 10 hours from the point of initiation of reduction of the pressure, and the polymerization time can be adjusted to an appropriated time of 1 to 5 hours by controlling the polymerization conditions. The polymerization time depends mainly on the kind and copolymerization ratio of the poly(alkylene oxide)glycol, but the polymerization time must be long enough to increase the polymerization degree to a level suitable for a molding elastomer material intended in the present invention.

The polymerization degree of the polyether-ester amide is such that the relative viscosity ($\eta r$) measured in a 0.5% solution in o-chlorophenol at 25° C. is 1.1 to 3.5, preferably 1.5 to 2.5. If the polymerization degree is outside this range, the mechanical properties and moldability are not satisfactory.

Heat-resistant an weathering stabilizers such as antioxidants, thermal decomposition-preventing agents, and ultraviolet absorbers can be incorporated in the polyether-ester amide of the present invention before or after the polymerization. Agents for modifying the properties of the product, such as a hydrolysis-resisting modifier, a colorant, an electrically conducting agent, a flame retardant, reinforcer, a filler, a lubricant, a nucleating agent, a release agent, a plasticizer, an adhesive assistant, and a tackifier, may be incorporated according to the intended use.

The antistatic effect can be enhanced by incorporating a metal salt of a sulfonic acid or an anionic, cationic surface active agent.

The polyether-ester amide of the present invention can be formed into an elastic shaped article by any shaping method adopted for thermoplastic plastics and rubbers. For example, there can be mentioned an injection molding method, an extrusion shaping method, a compression molding method, a blow molding method, a calendering method and a coating method. The so-obtained polyether-ester amide shaped article has a good transparency, and the transparency can be further improved by appropriately adjusting the copolymerization ratio or shaping conditions.

The polyether-ester amide of the present invention can be used as an elastomer as it is. Furthermore, the polyether-ester amide may be mixed with various resins and used in the form of resin compositions. The kind of the resin to be mixed is not particularly critical. For example, there can be mentioned styrene resins such as ABS resins, AES resins, AAS resins, MBS resins, impact-resistant polystyrene, polystyrene and styrene/acrylonitrile copolymers, and polymethyl methacrylate, polycarbonates, polyamides, polyethylene terephthalate, polybutylene terephthalate, polyacetal, polyvinyl chloride, polyethylene, polypropylene and polyphenyleneether resins.

Preferably, the polyether-ester amide of the present invention is blended with a graft copolymerization product (B) formed by graft-polymerizing (a) a rubbery polymer with (b) the specified monomer mixture. A rubbery polymer having a glass transition temperature lower than 0° C. is preferably used as the rubbery polymer (a) as the constituent of the graft copolymerization product (B). More specifically, there can be mentioned diene type rubbers such as polybutadiene, polystyrene-butadiene, polyacrylonitrile-butadiene and polybutyl acrylate-butadiene, acrylic rubbers such as polyisoprene, polychloroprene and polybutyl acrylate, and an ethylene/propylene/diene monomer terpolymer. The rubbery polymer (a) is selected so that the difference of the refractive index between the polyether-ester amide (A) and the graft copolymerization product (B) is not larger than 0.02, preferably not larger than 0.01, especially preferably not larger than 0.005. If the difference of the refractive index therebetween exceeds 0.02, the transparency of the resulting composition is not satisfactory.

The monomer mixture (b) to be grafted onto the rubbery polymer (a) comprises 100 to 40% by weight of an aromatic vinyl monomer and a methacrylic acid ester and/or an acrylic acid ester, and 0 to 60% by weight of a vinyl cyanide monomer.

As the methacrylic or acrylic acid ester monomer as the constituent (b) of the graft copolymerization product (B), there can be mentioned methyl, ethyl, propyl, n-butyl and i-butyl esters of acrylic acid and methacrylic acid. As the aromatic vinyl monomer, there can be mentioned styrene, $\alpha$-methylstyrene, vinyltoluene, and p-t-butylstyrene. The proportion of the methacrylic and/or acrylic acid ester to the aromatic vinyl monomer is preferably from 99:1 to 10:90, by weight.

As the vinyl cyanide monomer, there can be mentioned acrylonitrile and methacrylonitrile.

Furthermore, other copolymerizable monoethylenically monomers, e.g., maleimide monomers such as maleimide, N-methylmaleimide, N-ethylmaleimide, and N-phenylmaleimide, and vinyl monomers such as N-vinylpyrrolidone, acrylamide, maleic anhydride, acrylic acid, and methacrylic acid can be copolymerized according to need.

The monomers of the monomer mixture (b) are preferably selected so that the difference of the refractive index between the rubbery polymer (a) and the polymer obtained by polymerizing alone the vinyl monomer mixture (b) is not larger than 0.02, especially not larger than 0.01, particularly especially not larger than 0.005.

The refractive index of the matrix resin composed solely of the monomer mixture can be calculated by a theoretical formula or by measuring the refractive index of a polymer formed by polymerizing alone the monomer mixture having the composition of the matrix resin.

The graft copolymerization product (B) is obtained by graft-polymerizing 1 to 80 parts by weight, preferably 10 to 70 parts by weight, of the rubbery polymer (a) with 99 to 20 parts by weight, preferably 90 to 30 parts by weight, of the monomer mixture (b) comprising 100 to 40% by weight of the aromatic vinyl monomer and the methacrylic and/or acrylic acid ester monomer, and 0 to 60% by weight of the vinyl cyanide monomer according to a known polymerization process, for example, a process in which the monomer mixture is emulsion-graft-polymerized in the presence of a latex of the rubbery polymer while continuously feeding a polymerization initiator and an emulsifier.

If the amoun of the rubbery polymer in the graft copolymerization product is smaller than 1 part by weight, the obtained composition has a poor impact resistance. If the amount of the rubbery polymer exceeds 80 parts by weight, the dispersion state of the rubbery polymer is bad and the transparency and impact resistance are not satisfactory.

The graft copolymerization product (B) may be in the form of a copolymerization product obtained by copolymerizing a part of the above-mentioned monomer mixture, optionally together with other monoethylenically unsaturated monomer copolymerizable with the monomer mixture, for example, a maleimide monomer such as maleimide, N-methylmaleimide, N-ethylmaleimide or N-phenylmaleimide, or N-vinylpyrrolidone.

As pointed out hereinbefore, the difference of the refractive index between the polyether-ester amide (A) and the graft copolymerization product (B) is not larger than 0.02, preferably not larger than 0.01, especially preferably not larger than 0.005. If the difference of the refractive index exceeds 0.02, the transparency of the composition is not satisfactory.

The composition of the present invention comprising the polyether-ester amide (A) and the rubbery polymer (B) may further comprise (C) a modified vinyl polymer containing at least one member selected from the group consisting of a carboxyl group, an epoxy group, an amino group and a substituted amino group. This polymer (C) is obtained by homopolymerizing one monoethylenically unsaturated monomer or copolymerizing at least two monoethylenically unsaturated monomers, and has at least one member selected from the group consisting of a carboxyl group, an epoxy group, an amino group and a substituted amino group in the molecule. This polymer is hereinafter referred to as "modified vinyl polymer". The carboxyl group may be an anhydrous carboxyl group. The content of the carboxyl, epoxy, amino or substituted amino group may be very low, or the amount of the carboxyl group, epoxy group, amino group or substituted amino group may be large, so long as the performances thereof as the resin are satisfactory.

If the modified vinyl polymer (C) contains at least one of the carboxyl, epoxy, amino or substituted amino group on the average in one molecule, the modified vinyl polymer (C) can improve the compatibility between the components (A) and (B) while maintaining the transparency and antistatic effects at high levels.

If the sum of the carboxyl, epoxy, amino and substituted amino groups contained in the modified vinyl monomer (C) is $5 \times 10^{-7}$ to 0.5 mole per 100 g of the total resin composition, the compatibility between the component (A) and (B) is greatly improved and the stress at break is increased, and interlaminar separation does not occur.

The process for introducing the carboxyl group into the modified vinyl polymer (C) is not particularly critical and, for example, there can be adopted (1) a process in which a monoethylenically unsaturated monomer containing a carboxyl group or an anhydrous carboxyl group, such as acrylic acid, methacrylic acid, maleic acid, monoethyl maleate, maleic anhydride, phthalic acid or itaconic acid, is copolymerized with another monoethylenically unsaturated monomer, (2) a process in which monoethylenically unsaturated monomers are copolymerized in the presence of a polymerization initiator having a carboxyl group, such as γ,γ'-azo-bis(7-cyanovaleric acid), α,α'-azobis(α-cyanoethyl-p-benzoic acid) or succinic acid peroxide, and/or a polymerization degree-adjusting agent having a carboxyl group, such as thioglycolic acid, α-mercaptopropionic acid, β-mercaptopropionic acid, α-mercaptoisobutyric acid, 2-, 3- or 4-mercaptobenzoic acid, and (3) a process in which a homopolymer or copolymer of a methacrylic or acrylic acid ester such as methyl methacrylate or butyl acrylate is saponified with an alkali.

The process for introducing an epoxy group in the modified vinyl polymer (C) is not particularly critical and, for example, there can be adopted a process in which a compound represented by the following general formula (V):

wherein R stands for a hydrogen atom, a lower alkyl group having 1 to 6 carbon atoms, or a lower alkyl group having 1 to 6 carbon atoms, substituted with a glycidyl ester group,
such as glycidyl acrylate, glycidyl methacrylate, glycidyl ethacrylate or glycidyl itaconate, is copolymerized with anothe monoethylenically unsaturated monomer.

The process for introducing an amino or substituted amino group into the modified vinyl monomer (C) is not particularly critical, and for example, there can be adopted (1) a process in which a monoethylenically unsaturated monomer having at least one functional group selected from the group consisting of amino and substituted amino groups represented by the following formula (VI):

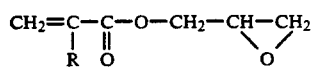

wherein $R^3$ stands for a hydrogen atom, a methyl group or an ethyl group, and $R^4$ stands for a hydrogen atom, an alkyl group having 1 to 12 carbon atoms, an alkanoyl group having 2 to 12 carbon atoms, a phenyl or cycloalkyl group having 6 to 12 carbon atoms or a derivative thereof,
is copolymerized with another monoethylenically unsaturated monomer, and (2) a process in which a monoethylenically unsaturated monomer is homopolymerized or monoethylenically unsaturated monomers are copolymerized in the presence of a chain transfer agent and/or an initiator, which has at least one functional group selected from the group consisting of amino and substituted amino groups represented by the above-mentioned general formula (VI) and mineral acid salts thereof.

As specific examples of the monoethylenically unsaturated monomer having at least one functional group selected from the above-mentioned amino and substituted amino groups, there can be mentioned alkyl ester derivatives of acrylic acid and methacrylic acid, such as aminoethyl acrylate, propylaminoethyl acrylate, methylaminoethyl methacrylate, ethylaminopropyl methacrylate, phenylaminoethyl methacrylate and cyclohexylaminoethyl methacrylate; vinylamine derivatives such as N-vinyldiethylamine and N-acetylvinyl amine; allylamine derivatives such as allylamine, methallylamine and N-methylallylamine; methacrylamide and acrylamide derivatives such as acrylamide, methacrylamide and N-methylacrylamide; and aminostyrene derivatives such as p-amino-styrene.

As specific examples of the chain transfer agent having the above-mentioned functional group, there can be mentioned mercaptomethylamine, β-mercaptomethylamine, γ-mercaptopropylamine, N-(β-mercaptoethyl)-N-methylamine, N-(β-mercaptoethyl)-N-ethylamine, N-(β-mercaptoethyl)-N-phenylamine, N-(β-mercaptoethyl)-N-cyclohexylamine, bis-(4-aminopheny)disulfide, bis-(2-aminophenyl)disulfide, bis-(3-aminophenyl)disulfide, p-mercaptoaniline, o-mercaptoaniline, m-mercaptoaniline, and hydrochlorides thereof.

As specific examples of the initiator having the above-mentioned functional group, there can be mentioned α,α'-azobis(γ-amino-α,γ-dimethylvaleronitrile), α,α'-azobis(γ-methylamino-α,γ-dimethylvaleronitrile), α,α'-azobis(γ-ethylamino-α,γ-dimethylvaleronitrile, α,α'-azobis(γ-propylamino-α, γ-dimethylvaleronitrile), α,α'-azobis(γ-diethylamino-α,γ-dimethylvaleronitrile), α,α'-azobis(γ-dimethylamine-α-dimethylvaleronitrile), α,α'-azobis(γ-dipropylamino-α,γ-dimethyl-valeronitrile) and p-aminobenzoyl peroxide.

The monoethylenically unsaturated monomer to be used for formation of the modified vinyl polymer (C) is not particularly critical. For example, there can be mentioned aromatic vinyl monomers such as styrene, α-methylstyrene and vinyltoluene; vinyl cyanide monomers such as acrylonitrile and methacrylonitrile; methacrylic and acrylic acid ester monomers such as methyl methacrylate, ethyl methacrylate, methyl acrylate and butyl acrylate; α,β-unsaturated carboxylic acids and anhydrides thereof such as methacrylic acid, acrylic acid, maleic acid and maleic anhydride; maleimide monomers such as maleimide, N-methylmaleimide and N-phenylmaleimide; olefin monomers such as ethylene and propylene; and vinyl monomers such as vinyl chloride, vinyl acetate and butadiene. These monomers are appropriately chosen according to the object and are used alone or in the form of a mixture of two or more thereof. In view of the mechanical properties of the obtained resin composition, preferably an aromatic vinyl monomer such as styrene, a methacrylic or acrylic acid ester monomer such as methyl methacrylate, a vinyl cyanide monomer such as acrylonitrile or a maleimide monomer such as N-phenylmaleimide is used.

If necessary, a rubbery polymer such as polybutadiene, an acrylonitrile/butadiene copolymer (NBR), a styrene/butadiene copolymer (SBR), polybutyl acrylate or an ethylene/propylene/diene rubber (EPDM) can be used in combination with the above-mentioned monoethylenically unsaturated monomer.

The process for the preparation of the modified vinyl polymer (C) is not particularly critical, and ordinary processes such as a bulk polymerization process, a solution polymerization process, a suspension polymerization process, an emulsion polymerization process and a bulk/suspension polymerization process can be adopted.

Furthermore, a polymer obtained by grafting at least one member selected from the above-mentioned carboxyl, epoxy, amino and substituted amino groups to the graft copolymerization product (B) may be included in the composition of the present invention.

In the production of the modified vinyl polymer (C), the monoethylenically unsaturated monomer is selected so that the difference of the refractive index of the modified vinyl polymer (C) from those of the polyether-ester amide (A) and the graft copolymerization product (B) is not larger than 0.02, preferably not larger than 0.01, especially preferably not larger than 0.005. If this difference of the refractive index exceeds 0.02, the transparency of the resulting resin composition becomes poor.

The composition of the present invention, which comprises the polyether-ester amide (A), the rubbery polymer (B) and the optional modified vinyl polymer, may further comprise less than 98% by weight, based on the total composition, of (D) a copolymer derived from a monomer mixture comprising 100 to 40% by weight of an aromatic vinyl monomer and at least one monomer selected from a methacrylic acid ester and an acrylic acid ester, 0 to 60% by weight of a vinyl cyanide monomer and 0 to 60% by weight of other copolymerizable monoethylenically unsaturated monomer.

The copolymer (D) may be derived either from the same monomer mixture as the monomer mixture (b) used for the preparation of the graft copolymerization product (B), or from part of the same monomer mixture. As the aromatic vinyl monomer, the methacrylic acid ester, the acrylic acid ester the vinyl cyanide monomer, and the other copolymerizable monoethylenically unsaturated monomer, there can be mentioned those which are listed with regard to the monomer mixture (b) for the graft copolymerization product (B).

The monomers used for the preparation of the copolymer (D) are preferably selected so that the difference of the refractive index among the components (A), (B), (C) and (D) is not larger than 0.02, especially not larger than 0.01, particularly especially not larger than 0.005. The amount of the copolymer (D) may be appropriately varied depending upon the intended product.

The above-mentioned polymers (A), (B), (C) and (D) are mixed to form a resin composition comprising 1 to 40% by weight, preferably 3 to 30% by weight, of the polyether-ester amide (A), 1 to 95% by weight, preferably 2 to 96% by weight, of the graft copolymerization product (B), 0 to 98% by weight, preferably 1 to 95% by weight, of the modified vinyl polymer (C) containing a carboxyl, epoxy, amino or substituted amino group, and 0 to 98% by weight, preferably 1 to 95% by weight, of the copolymer (D).

If the amount of the polyether-resin amide (A) is smaller than 1% by weight, the antistatic property of the resin composition is not satisfactory and if the amount of the polyether-resin amide (A) exceeds 40% by weight, the resin composition becomes too soft and the mechanical properties become poor.

If the amount of the graft copolymerization product (B) is smaller than 1% by weight, the impact resistance of the resin composition is not satisfactory and if the amount of the graft copolymer or graft copolymer composition (B) exceeds 99% by weight, the antistatic property becomes poor.

The process for the preparation of the resin composition of the present invention is not particularly critical. For example, the intended resin composition can be obtained by kneading the polyether-ester amide (A) with the graft copolymerization product (B) optionally together with the modified vinyl polymer (C) and the copolymer (D) by a Banbury mixer, a roll, an extruder or the like.

The antistatic effect can be further enhanced by adding an antistatic agent, for example, a metal salt of sulfonic acid or an anionic, cationic or non-ionic surface active agent, so long as the transparency of the resin composition is satisfactory. If necessary, a stabilizer such as an antioxidant or an ultraviolet absorber, a pigment, a dye, a lubricant, a plasticizer, and the like can be added.

Moreover, the compatibility between the components (A) and (B) can be further improved by an addition of a metal salt of sulfonic acid, a tertiary amine or a phosphorus compound.

The present invention will now be described in detail with reference to the following examples. In the examples, all of "%") and "parts" are by weight unless otherwise indicated.

EXAMPLE 1

A reaction vessel equipped with helical ribbon stirring vanes was charged with 45 parts of caprolactam, 1.43 parts of 2,2'-bis(4-β-hydroxyethoxyph-enyl)propane ("Newpol BPE-20" supplied by Sanyo Chem. Ind.), 43.56 parts of polyethylene glycol having a number average molecular weight of 600 (PEG 600), 13.29 parts of terephthalic acid, 0.20 part of an antioxidant ("Irganox 1098") and 0.1 part of mono-n-butylmonohydroxytin oxide. The inner atmosphere was substituted with N$_2$ and the mixture was heated and stirred at 260° C. for 60 minutes to obtain a transparent homogenous solution. The pressure was reduced according to a predetermined program and a polymerization pressure lower than 0.5 mmHg was produced.

Under this polymerization condition, reaction was carried out for 3 hours and 40 minutes. At this point, the stirring torque was 8.0 kg.m at 11 rpm. The polymer Shore hardness: 40D
Total luminous transmittance: 87%
Haze: 4.1%

EXAMPLES 2 TO 5 AND COMPARATIVE EXAMPLES 1 to 4

The procedures of Example 1 were repeated in the same manner except that the copolymerization composition was changed as shown in Table 1. The characteristics of the obtained polymers were evaluated.

The results are shown in Table 1.

TABLE 1

|  | Example No. | | | | | Comparative Example No. | | | |
|---|---|---|---|---|---|---|---|---|---|
|  | 1 | 2 | 3 | 4 | 5 | 1 | 2 | 3 | 4 |
| Copolymerization composition | | | | | | | | | |
| Caprolactam (parts) | 45 | 45 | 30 | 55 | 70 | 45 | 5* | 95* | 45 |
| BPE-20 (parts) | 1.43 | 3.57 | 0.72 | 2.14 | 3.57 | —* | 0.36 | 1.43 | 1.43 (PEG100)* |
| PEG-600 (parts) | 43.56 | 41.10 | 56.71 | 34.52 | 20.55 | 45.21 | 77.67 | 2.47 | 23.04 |
| Terephthalic acid (parts) | 13.04 | 13.46 | 16.38 | 10.86 | 7.66 | 12.76 | 22.11 | 1.44 | 39.78 |
| Polymerization conditions | | | | | | | | | |
| Polymerization time (hr · mm) | 3:40 | 4:00 | 4:55 | 3:15 | 2:50 | 3:30 | 8:00 | 2:10 | 8:00 |
| Torque (kg · m) | 8 | 8 | 8 | 8 | 8 | 8 | 1 | 8 | 3 |
| Relative viscosity ($\eta r$) | 1.98 | 1.95 | 2.04 | 1.91 | 1.90 | 1.98 | 1.31 | 2.76 | 1.52 |
| Mechanical properties | | | | | | | | | |
| Tensile elastic modulus (kg · cm$^2$) | 810 | 750 | 500 | 1390 | 4700 | 870 | 28 | 7700 | 120 |
| Tensile strength at break (kg · cm$^2$) | 370 | 390 | >200 | 580 | 260 | 350 | 70 | 160 | 145 |
| Tensile elongation at break (kg · cm$^2$) | 1120 | 1180 | >1200 | 810 | 360 | 880 | >1200 | 210 | >1200 |
| Shore hardness | 40 D | 33 D | 26 D | 49 D | 65 D | 42 D | 10 A | >100 D | 31 A |
| Transparency | | | | | | | | | |
| Just after molding | | | | | | | | | |
| Total luminous transmittance (%) | 87 | 88 | 88 | 86 | 81 | 82 | 88 | 22 | 87 |
| Haze (%) | 4.1 | 3.9 | 4.0 | 4.7 | 7.2 | 6.2 | 4.0 | 90 | 4.0 |
| After standing for 100 days | | | | | | | | | |
| Total luminous transmittance (%) | 86 | 88 | 87 | 86 | 78 | 71 | 88 | <10 | 87 |
| Haze (%) | 4.5 | 4.0 | 4.1 | 4.8 | 7.5 | 15 | 4.1 | >90 | 4.0 |

Note: Each asterisk (*) indicates the value outside the scope of the present invention.

was extruded in the form of gut on a cooling belt and pelletized. The relative viscosity of the obtained polyether-ester amide had a relative viscosity ($\eta r$) or 1.98 (as measured in o-chlorophenol at 25° C. at a polymer concentration of 0.5%). The copolymerization composition determined by the NMR analysis was as follows.

Residue of caprolactam: 39.3%
Residue of 2,2'-bis(4-β-hydroxyethoxyphenyl)propane: 1.4%
Residue of PEG: 45.4%
Residue of terephthalic acid: 13.9%

Various test pieces were formed from this polyether-ester amide by injection molding, and the mechanical properties were measured according to the ASTM standards.

For determination of the transparency, a test piece was allowed to stand at a temperature of 23° C. and a relative humidity of 50% for 1 day, and the total luminous transmittance and haze were measured by a direct-reading haze meter (supplied by Toyo Seiki K.K.). Furthermore, the test piece was allowed to stand at a temperature of 23° C. and a relative humidity of 50% for 100 days, and the total luminous transmittance and haze were measured. The test piece used had a diameter of 40 mm and a thickness of 2 mm. The tensile strength at break and the Shore hardness were measured according to the JIS K-7113 and the ASTM D-2240, respectively. The results are as follows.

Tensile elastic modulus: 810 kg/cm$^2$
Tensile strength at break: 370 kg/cm$^2$
Tensile elongation at break: 1120%

The following can be seen from the results shown in Table 1.

Each of the polyether-ester amides of the present invention (Examples 1 through 5) has excellent mechanical properties represented by the tensile characteristics and has a high light transmittance. Furthermore, the light transmittance varies only to a minor extent with the lapse of time and an excellent transparency is kept.

Where the diol compound (b) is not contained in the copolymerization composition of the polyether-ester amide (Comparative Example 1), the transparency decreases with the lapse of time and, therefore, the polymer is not preferred. If the content of the polyether-ester unit is lower than 10% by weight (Comparative Example 2), the mechanical properties are poor, and if the content of the polyether-ester units exceeds 90% by weight, the transparency is poor.

If the number average molecular weight of the poly(alkylene oxide)glycol is lower than 200 (Comparative Example 4), the polymerization reaction time is long and satisfactory mechanical properties cannot be obtained.

EXAMPLE 6

The same reaction vessel as used in Example 1 was charged with 40 parts of caprolactam, 6.04 parts of 1,4-(β-hydroxyethoxy)benzene, 44.25 parts of polyethylene glycol having a number average molecular weight of 1,000, 13.20 parts by terephthalic acid and 0.20 part of "Irganox 1098". The inner atmosphere was substituted with N$_2$ and the mixture was heated and stirred at 260° C. for 60 minutes to from a transparent homogeneous solution. The pressure was reduced to 500 mmHg according to a predetermined program to remove water from the gas phase in the reaction vessel. Then, 0.1 part of zirconium tetrabutoxide was added, and the pressure was further reduced according to the predetermined program to produce a polymerization condition of a pressure lower than 0.5 mmHg.

When reaction was conducted under this polymerization condition for 2 hours and 45 minutes, the stirring torque was 8.0 kg.m at 11 rpm. The polymer was pelletized in the same manner as described in Example 1.

The relative viscosity ηr of the polyether-ester amide was 2.04 as measured in the same manner as described in Example 1, and the copolymerization composition determined by the NMR analysis was as follows.
Residue of caprolactam: 34.2%
Residue of 1,4-bis(β-hydroxyethoxy)benzene: 5.9%
Residue of PEG: 46.4%
Residue of terephthalic acid: 13.5%

This polyether-ester amide was evaluated in the same manner as described in Example 1. The following results were obtained.
Tensile elastic modulus: 710 kg/cm$^2$
Tensile strength at break: 360 kg/cm$^2$
Tensile elongation at break: 1080%
Shore hardness: 38D
Total liminous transmittance: 88%
Haze: 3.6%

EXAMPLE 7

A polyether-ester amide was obtained by conducting polymerization in the same manner as described in Example 6 by using 40 parts of caprolactam, 6.56 parts of 2,6-bis(β-hydroxyethoxy)naphthalene, 37.74 parts of polyethylene glycol having a number average molecular weight of 400 and 21.33 parts of terephthalic acid.

The relative viscosity ηr of the polyether-ester amide was 2.01, and the copolymerization composition determined by the NMR analysis was as follows.
Residue of captolactam: 34.4%
Residue of 2,6-bis(β-hydroxyethoxy)naphthalene: 6.4%
Residue of PEG: 37.9%
Residue of terephthalic acid: 21.3%

The characteristics of this polymer were evaluated in the same manner as described in Example 1. The following results were obtained.
Tensile elastic modulus: 680 kg/cm$^2$
Tensile strength at break: 310 kg/cm$^2$
Tensile elongation at break: 970%
Shore hardness: 33D
Total luminous transmittance: 90%
Haze: 3.2%

EXAMPLE 8

The same reaction vessel as used in Example 1 was charged with 40 parts of 12-aminododecanoic acid, 7.16 parts of BPE-20, 44.25 parts of polyethylene glycol having a number average molecular weight of 1,000, 11.67 parts of terephthalic acid, 0.20 part of "Irganox 1098" and 0.01 part of antimony trioxide. The inner atmosphere was substituted with N2 and the mixture was heated and stirred at 260° C. for 60 minutes to obtain a transparent homogeneous solution. The presence was reduced to 300 mmHg according to a predetermined program to remove water from the gas phase in the reaction vessel. Then, 0.09 part of zirconium tetrabutoxide was added and the pressure was further reduced according to the predetermined program to produce a polymerization condition of a pressure lower than 0.5 mmHg.

When reaction was carried out under this condition for 2 hours and 15 minutes, the stirring torque was 11 kg.m at 11 rpm. The polymer was pelletized in the same manner as described in Example 1.

The relative viscosity ηr of the obtained polyether-ester amide, measured in the same manner as described Example 1, was 2.06, and the copolymerization composition determined by the NMR analysis was as follows.
Residue of 12-aminododecanoic acid: 39.7%
Residue of 2,2-(4-β-hydroxyphenyl)propane: 6.6%
Residue of PEG: 42.6%
Residue of terephthalic acid: 11.1%

The characteristics of this polyether-ester amide were evaluated in the same manner as described in Example 1. The results are as follows.
Tensile elastic modulus: 750 kg/cm$^2$
Tensile strength at break: 360 kg/cm$^{2l}$
Tensile elongation at break: 750%
Shore hardness: 35D
Total luminous transmittance: 88%
Haze: 3.3%

EXAMPLE 9

The same reaction vessel as used in Example 1 was charged with 45 parts of caprolactam, 3.0 parts of BPE-20, 43.1 parts of polyethylene glycol having a number average molecular weight of 600, 13.1 parts of adipic acid, 0.20 part of "Irganox 1098" and 0.01 part of antimony trioxide. The inner atmosphere was substituted with N2 and the mixture was heated and stirred at 260° C. for 60 minutes to obtain a transparent homogeneous solution. According to a predetermined program, the pressure was reduced to 300 mmHg to remove water from the gas phase in the reaction vessel. Then, 0.09 part of zirconium tetrabutoxide was added and the pressure was further reduced according to the predetermined program to produce a polymerization condition of a pressure lower than 0.5 mmHg.

When reaction was carried out under this condition for 3 hours and 10 minutes, the stirring torque was 8.0 kg.m at 11 rpm. The polymer was pelletized in the same manner as described in Example 1.

The relative viscosity ηr of the obtained polyether-ester amide, measured in the same manner as described in Example 1, was 1.98, and the copolymerization composition determined by the NMR analysis was as follows.
Residue of caprolactam: 35.3%
Residue of 2,2-bis(4-β-hydroxyethoxyphenyl)propane: 3.2%
Residue of PEG: 47.3%
Residue of adipic acid: 14.2%

The characteristics of this polyether-ester amide were evaluated in the same manner as described in Example 1. The results are as follows.
Tensile elastic modulus: 730 kg/cm$^2$
Tensile strength at break: 340 kg/cm$^2$
Tensile elongation at break: 1010%
Shore hardness: 38D
Total luminous transmittance: 86%
Haze: 5.1%

The resin composition of the present invention will now be described in the following examples. The final resin composition was molded into test pieces by injection molding, and the physical properties were measured according to the following test methods.

Izod impact strength:

The Izod impact strength was determined according to ASTM D-256-56A

Tensile strength:

The tensile strength was determined according to ASTM D-638.

Flexural elastic modulus:

The flexural elastic modulus was determined according to ASTM D-790.

Volume resistivity:

A disk having a thickness of 2 mm and a diameter of 40 mm was prepared and the measurement was conducted in an atmospheric maintained at room temperature (23° C) and a relative humidity of 50%. A super-insulation resistance meter (Model SM-10E supplied by Toa Denpa Kogyo K.K.) was used for the measurement.

Light transmittance:

The same as in Examples 1 through 9.

Refractive index:

A test piece having a thickness of 1 mm and a size of 7.5 mm×2.5 mm was prepared. The refractive index was measured at 20° C. by using D-ray of sodium in an Abbe refractometer (supplied by ERMA Kogaku K.K.).

Adhesion stress at break:

A tensile test piece was prepared according to ASTM D-638. A chloroform solution containing 10% of the same thermoplastic resin composition as that of the test piece was prepared. Two test pieces prepared in the same manner as described above were bonded together by using the above solution as an adhesive so that a rectangular edge face having a size of 3 mm×12.7 mm of one test piece was placed in contact with and adhered to the major surface of the other test piece in such a manner that the axis of the one test piece was vertical to the major surface of the other test piece. The bonded assembly was allowed to stand at 23° C. for 24 hours. Then, pulling was effected at a distortion speed of 5 mm/min in the direction perpendicular to the bonded face, and the stress at break was measured.

Appearance:

The test piece was observed with the naked eye and the appearance was evaluated according to the following standards.

A: very good appearance
B: good appearance
C: bad appearance with impaired surface Referential Example Preparation of Polyether-ester Amide (A) A-1

A reaction vessel equipped with helical ribbon stirring vanes was charged with 45 parts of ε-caprolactam, 45.21 parts of polyethylene glycol having a number average molecular weight of 600, 1.43 parts of BPE-20 (ethylene oxide adduct of bisphenol A supplied by Sanyo Chem. Ind.), 13.51 parts of terephthalic acid, 0.2 part of "Irganox 1098", 0.09 part of a mono-n-butyl-monohydroxytin oxide catalyst, and 0.01 part of an antimony trioxide. The inner atmosphere was substituted with nitrogen and the mixture was heated and stirred at 260° C. for 60 minutes to form a transparent homogeneous solution. Polymerization was carried out at 260° C. under a pressure lower than 0.5 mmHg for 4 hours to obtain a viscous transparent polymer. The polymer was extruded in the form of a gut on a cooling belt and pelletized to obtain a pelletized polyether-ester amide (A-1). The polyether-ester amide was allowed to stand at room temperature for 200 days, and it was found that the transparent state was maintained without growth of a crystal.

A-2

A polyether-ester amide (A-2) was prepared in the same manner as described above by using 40 parts of ε-caprolactam, 48.67 parts of polyethylene glycol having a number average molecular weight of 1,000, 3.57 parts of BPE-20 and 10.11 parts of terephthalic acid. When the transparency of this polyether-ester amide was confirmed in the same manner as described above with respect to the polyether-ester amide (A-1), it was found that the transparent state was maintained.

A-3

A polyether-ester amide (A-3) was prepared under the same conditions as described above by using 45 parts of ε-caprolactam, 46.48 parts of polyethylene glycol having a number average molecular weight of 600 and 12.03 parts of adipic acid. When the transparency of this polyether-ester amide was confirmed in the same manner as described above with respect to the polyether-ester amide (A-1), it was found that crystallization was advanced and the transparency was drastically reduced.

A-4

A reaction vessel equipped with helical ribbon stirring vanes was charged with 9.2 parts of a preliminarily prepared salt (nylon 6-I salt) of hexamethylenediamine and isophthalic acid (IPA), 32 parts of ε-caprolactam, 49.3 parts of polyethylene glycol having a number average molecular weight of 600, 13.9 parts of IPA, 0.2 part of "Irganox 1098" and 0.1 part of an antimony trioxide (SbO) catalyst, and the atmosphere was substituted with nitrogen and the mixture was heated and stirred at 240° C. for 60 minutes to form a transparent homogeneous solution. Polymerization was carried out at 260° under a pressure lower than 0.5 mmHg for 5 hours to obtain a viscous transparent polymer. The polymer was extruded in the form of a gut on a cooling belt and pelletized to obtain a pelletized polyether-ester amide (A-4). This polyether-ester amide was allowed to stand at room temperature for 200 days, and it was found that the transparency state was maintained without formation of a crystal.

A-5

A reaction vessel equipped with helical ribbon stirring vanes was charged with 47 parts of ε-caprolactam, 41.1 parts of polyethylene glycol having a number average molecular weight of 600, 2.15 parts of BPE-20 (ethylene oxide adduct of bisphenol A supplied by Sanyo Chem. Ind.), 13.3 parts of terephthalic acid, 0.3 part of "Irganox 1098" and 0.01 part of antimony trioxide. The inner atmosphere was substituted with $N_2$ and the mixture was heated and stirred at 260° C. for 60 minutes to form a transparent homogeneous solution. According to a predetermined program, the pressure was reduced to 300 mmHg to remove water in the gas phase in the reaction vessel, and 0.09 part of zirconium tetrabutoxide was added. Then, the pressure was further reduced according to the predetermined program and polymerization was carried out at 260° C. under a pressure lower than 0.5 mmHg for 3 hours to obtain a viscous transparent polymer. The polymer was extruded in the form of a gut on a cooling belt and pelletized to prepare a pelletized polyether-ester amide (A-5). Even after this polyether-ester amide was allowed to stand at room temperature for 200 days, the transparent state was maintained without growth of a crystal.

(2) Preparation of Graft Copolymerization product (B)

B-1

In the presence of 40 parts (as the solid) of a polybutadiene latex (average rubber particle diameter =0.25 μm, gel content=80%), 60 parts of a monomer mixture comprising 72% of methyl methacrylate, 24% of styrene and 4% of acrylonitrile was emulsion-polymerized. The obtained graft copolymer latex was coagulated by sulfuric acid, neutralized with sodium hydroxide, washed, filtered and dried to obtain a powdery graft copolymerization product (B-1).

B-2

In the presence of 50 parts (as the solid) of a styrene/butadiene copolymer latex (styrene copolymerization ratio=30%, rubber particle diameter =0.25 μm, gel content=78%), 50 parts of a monomer mixture comprising 52% of methyl methacrylate and 48% of styrene was emulsion-polymerized, and the post treatments were carried out in the same manner as described above with respect to (B-1), whereby a powdery graft copolymerization product (B-2) was prepared.

B-3

In the presence of 90 parts (as the solid) of the polybutadiene latex used for the production of (B-1), 10 parts of a monomer mixture comprising 72% of methyl methacrylate, 24% of styrene and 4% of acrylonitrile was emulsion-polymerized, and the post treatments were carried out in the same manner as described above with respect to (B-1), whereby a powdery graft copolymerization product (B-3) wa prepared.

(3) Preparation of Modified Vinyl Polymer (C)

C-1

A modified vinyl polymer (C-1) was prepared by suspension-polymerizing 63 parts of methyl methacrylate, 23 parts of styrene, 4 parts of acrylonitrile and 5 parts of methacrylic acid.

C-2

A modified vinyl polymer (C-2) was prepared by suspension-polymerizing 72 parts of methyl methacrylate, 25 parts of styrene and 3 parts of glycidyl methacrylate.

C-3

A modified vinyl polymer (C-3) was prepare emulsion-polymerizing 67 parts of methyl methacrylate, 24 parts f styrene, 4 parts of acrylonitrile and 5 parts of acrylamide.

C-4

A modified vinyl polymer (C-4) was prepared by suspension-polymerizing 72 parts of methyl methacrylate, 25 parts of styrene and 3 parts of aminoethyl acrylate.

(4) Copolymer (D)

D-1

A copolymer (D-1) was prepared by copolymerizing 72 parts of methyl methacrylate with 24 parts of styrene and 4 parts of acrylonitrile.

D-2

A copolymer (D-2) was prepared by copolymerizing 52 parts of methyl methacrylate with 48 parts of styrene.

EXAMPLES 10 to 17

The polyether-ester amide (A), graft copolymerization product (B), modified vinyl polymer (C) and copolymer (D) prepared in the Referential Example, which had refractive indexes shown in Table 3, were mixed at a mixing ratio shown in Table 2, and the mixture was melt-kneaded and extruded at a resin temperature of 200° C. by a vented extruder having a diameter of 40 mm, to form a pellet. A test piece was prepared from the pellet at a cylinder temperature of 230° C. and a mold temperature of 60° C. by an injection molding machine, and the physical properties thereof wer measured.

The volume resistivity was measured by using a disk having a thickness of 2 mm under the following conditions.

(1) Just after molding, the disk was washed with an aqueous solution of a detergent ("Mama-Lemon" supplied by Lion Corp.) and washed with distilled water. Water was removed from the surface and the disk was allowed to stand at a temperature of 23° C. and a relative humidity of 50% for 24 hours. Then, the volume resistivity was measured.

(2) After molding, the disk was allowed to stand at a temperature of 23° C. and a relative humidity of 50% for 200 days, and the disk was washed with an aqueous solution of the detergent ("Mama-Lemon") and washed with distilled water. Water was removed from the surface and the disk was allowed to stand at a temperature of 23° C. and a relative humidity of 50% for 24 hours. The measurement was then carried out.

The measurement results are shown in Table 4.

COMPARATIVE EXAMPLES 5 to 12

The polyether-ester amide (A), graft copolymerization product (B) and copolymer (D) prepared in the Referential Example were mixed at a ratio shown in Table 2. The physical properties were measured in the same manner as described in Example 10. The measurement results are shown in Table 4.

TABLE 2

| | | Resin Composition | | | | | | |
|---|---|---|---|---|---|---|---|---|
| | Polyether-ester amide (A) | | Graft copolymerization product (B) | | Modified vinyl polymer (C) | | Copolymer (D) | PC-S |
| | | (parts) | | (parts) | | (parts) | (parts) | (parts) |
| Example | | | | | | | | |
| 10 | A-1 | 15 | B-1 | 25 | — | — | D-1 60 | — |
| 11 | A-1 | 15 | B-1 | 25 | C-1 | 5 | D-1 55 | 0.5 |

TABLE 2-continued

| | Resin Composition | | | | | | | | |
|---|---|---|---|---|---|---|---|---|---|
| | Polyether-ester amide (A) | | Graft copolymerization product (B) | | Modified vinyl polymer (C) | | Copolymer (D) | | PC-S |
| | | (parts) | | (parts) | | (parts) | | (parts) | (parts) |
| 12 | A-1 | 30 | B-1 | 15 | C-1 | 10 | D-1 | 45 | (DBS)0.1 |
| 13 | A-2 | 10 | B-1 | 25 | C-1 | 5 | D-1 | 60 | 1.0 |
| 14 | A-1 | 15 | B-1 | 10 | C-2 | 5 | D-1 | 70 | — |
| 15 | A-1 | 15 | B-1 | 80 | C-1 | 5 | — | — | — |
| 16 | A-1 | 15 | B-1 | 25 | C-1 | 5 | D-1 | 55 | — |
| 17 | A-1 | 15 | B-1 | 85 | — | — | — | — | — |
| Comparative Example | | | | | | | | | |
| 5 | A-1 | 0.5* | B-1 | 25 | — | — | D-1 | 74.5 | — |
| 6 | A-1 | 55* | B-1 | 20 | C-1 | 10 | D-1 | 15 | — |
| 7 | A-1 | 15 | B-3* | 20 | — | — | D-1 | 65 | — |
| 8 | A-2 | 15 | B-2* | 25 | — | — | D-2* | 60 | — |
| 9 | A-3* | 15 | B-1 | 25 | — | — | D-1 | 60 | — |
| 10 | A-1 | 15 | B-1* | 25 | — | — | D-2* | 60 | — |
| 11 | A-1 | 15 | —* | — | — | — | D-1 | 85 | — |
| 12 | A-4* | 15 | B-1 | 30 | — | — | D-1 | 55 | — |

Note:
PC-S: Electrostripper (antistatic agent supplied by Kao Corp.)
DBS: Sodium dodecylbenzene-sulfonate (surfactant supplied by Kao Corp.)
Each asterisk (*) indicates the value outside the scope of claim in the present application.

TABLE 3

| | Refractive Indexes ($n_D^{20° C.}$) of Polymers | | | | | | | | |
|---|---|---|---|---|---|---|---|---|---|
| $n_D^{20° C.}$ of polymer (A) | | $n_D^{20° C.}$ of polymer (B) | | $n_D^{20° C.}$ of rubbery polymer (a) | Rubber | $n_D^{20° C.}$ of polymer of monomer mixture (b) alone | $n_D^{20° C.}$ of polymer (C) | | $n_D^{20° C.}$ of polymer (D) | |
| A-1 | 1.517 | B-1 | 1.517 | 1.516 | PBD | 1.518 | C-1 | 1.517 | D-1 | 1.518 |
| A-2 | 1.511 | B-2 | 1.540 | 1.540 | SBR | 1.541 | C-2 | 1.516 | D-2 | 1.541 |
| A-3 | 1.515 | B-3 | 1.516 | 1.516 | PBD | 1.518 | C-3 | 1.519 | | |
| A-4 | 1.519 | | | | | | C-4 | 1.518 | | |
| A-5 | 1.519 | | | | | | | | | |

TABLE 4

| | Physical Properties | | | | | | | | | |
|---|---|---|---|---|---|---|---|---|---|---|
| | Transparency | | Tensile properties | | | | Volume resistivity | | | |
| | Total luminous transmittance (%) | Haze (%) | Yield stress (kg/cm²) | Elongation at break (%) | Flexural modulus (kg/cm²) | ½″ Izod impact strength (notched) (kg · cm/cm) | Just after molding (Ω · cm) | After 200 days standing (Ω · cm) | Stress at break (kg/cm²) | Appearance |
| Example | | | | | | | | | | |
| 10 | 87 | 5.7 | 440 | 52 | 21400 | 9 | $4 \times 10^{11}$ | $3 \times 10^{11}$ | 31 | A |
| 11 | 87 | 4.5 | 430 | 87 | 22000 | 15 | $7 \times 10^{10}$ | $5 \times 10^{10}$ | 95 | A |
| 12 | 82 | 7.4 | 370 | 111 | 19200 | 30 | $8 \times 10^9$ | $4 \times 10^9$ | 60 | B |
| 13 | 75 | 8.8 | 460 | 59 | 23100 | 12 | $5 \times 10^{11}$ | $4 \times 10^{11}$ | 105 | A |
| 14 | 87 | 4.2 | 480 | 42 | 23500 | 7 | $7 \times 10^{11}$ | $5 \times 10^{10}$ | 92 | A |
| 15 | 83 | 7.4 | 360 | 116 | 17200 | 29 | $2 \times 10^{11}$ | $1 \times 10^{10}$ | 51 | A |
| 16 | 87 | 4.0 | 440 | 93 | 22100 | 16 | $5 \times 10^{11}$ | $3 \times 10^{11}$ | 102 | A |
| 17 | 78 | 8.5 | 310 | 81 | 16800 | 15 | $6 \times 10^{11}$ | $5 \times 10^{11}$ | 23 | A |
| Comparative Example | | | | | | | | | | |
| 5 | 88 | 3.8 | 460 | 42 | 23000 | 12 | $1 \times 10^{16}$ | $1 \times 10^{15}$ | 115 | A |
| 6 | 81 | 8.6 | 210 | >200 | 7900 | Not broken | $5 \times 10^8$ | $4 \times 10^8$ | 18 | A |
| 7 | 79 | 9.6 | 380 | 31 | 21800 | 4 | $9 \times 10^{11}$ | $7 \times 10^{11}$ | 25 | C*1 |
| 8 | 39 | 73 | 420 | 50 | 21800 | 8 | $4 \times 10^{11}$ | $2 \times 10^{11}$ | 29 | A |
| 9 | 35 | 78 | 420 | 49 | 21600 | 7 | $1 \times 10^{11}$ | $1 \times 10^{11}$ | 30 | A |
| 10 | 43 | 50 | 430 | 50 | 21700 | 7 | $4 \times 10^{11}$ | $3 \times 10^{11}$ | 30 | A |
| 11 | 87 | 4.0 | 490 | 12 | 24100 | 2 | $9 \times 10^{11}$ | $9 \times 10^{11}$ | 36 | A |
| 12 | 84 | 16 | 380 | 97 | 19800 | 10 | $2 \times 10^{11}$ | $1 \times 10^{11}$ | 31 | B |

*1: Fish eye occurred

The following can be seen from the results shown in Table 4.

Each of the resin compositions of the present invention (Examples 10 through 17) has an excellent transparency and mechanical properties represented by the impact strength and a low volume resistivity. Furthermore, the resistance value is changed only to a slight extent by surface washing or with the lapse of time, and an excellent permanent antistatic effect is exerted.

Moreover, the appearance of the molded article is excellent.

Namely, the resin composition of the present invention has excellent mechanical properties, permanent antistatic effect and transparency in combination and provides a molded article having a very good appearance.

The resin composition of the present invention comprising the modified vinyl polymer (C) has a high stress at break and interlaminar separation is not caused, and a molded product prepared from the resin composition is excellent.

If the content of the polyether-ester amide (A) is lower than 1% by weight (Comparative Example 5), the antistatic effect (resistivity) is poor, and if the content of the polyether-ester amide (A) exceeds 40% by weight, the tensile yield stress and flexural modulus are poor.

If the graft copolymerization product (B) used contains the rubbery polymer in an amount exceeding 80 parts by weight (Comparative Example 7), the dispersibility of the product (B) is poor and the appearance of the molded article is impaired. Where the polyether-ester amide (A) not including the diol compound (b) copolymerized is used and where the difference of the refractive index among the polyether-ester amide (A), graft copolymerization product (D) and copolymer (D) exceeds 0.02 (Comparative Examples 8 through 10 and 12), the transparency is drastically degraded.

Where the graft copolymerization product (B) is not contained (Comparative Example 11), the impact resistance is poor.

EXAMPLES 18 THROUGH 26

The polyether-ester amide (A), graft copolymerization product (B), modified vinyl polymer (C) and copolymer (D) prepared in the Referential Example, which had refractive indexes shown in Table 3, were mixed at a ratio shown in Table 5, and the mixture was melt-kneaded and extruded at a resin temperature of 200° C. by a vented extruder having a diameter of 40 mm to prepare a pellet. The pellet was molded into a test piece at a cylinder temperature of 230° C. and a mold temperature of 60° C. by an extrusion molding machine. The physical properties were measured. The results are shown in Table 6.

COMPARATIVE EXAMPLES 13 to 20

The polyether-ester amide (A), graft copolymerization product (B) and copolymer (D) prepared in the Referential Example, which had refractive indexes shown in Table 3, were mixed at a ratio shown in Table 5. The physical properties were measured in the same manner as described in Example 18. The results are shown in Table 6.

TABLE 5

| | Resin Composition | | | | | | | | |
|---|---|---|---|---|---|---|---|---|---|
| | Polyether-ester amide (A) | | Graft copolymerization product (B) | | Modified vinyl polymer (C) | | Copolymer (D) | | Antistatic agent |
| | | (parts) | | (parts) | | (parts) | | (parts) | (parts) |
| Example | | | | | | | | | |
| 18 | A-5 | 15 | B-1 | 25 | C-1 | 6 | D-1 | 54 | — — |
| 19 | A-5 | 15 | B-1 | 25 | C-1 | 6 | D-1 | 54 | PC-S 0.5 |
| 20 | A-5 | 30 | B-1 | 15 | C-2 | 15 | D-1 | 40 | — — |
| 21 | A-2 | 10 | B-1 | 25 | C-2 | 4 | D-1 | 61 | HES 0.5 |
| 22 | A-2 | 15 | B-1 | 10 | C-2 | 6 | D-1 | 69 | — — |
| 23 | A-5 | 15 | B-1 | 79 | C-1 | 6 | — | — | — — |
| 24 | A-2 | 10 | B-1 | 25 | C-2 | 4 | D-1 | 61 | — — |
| 25 | A-5 | 5 | B-1 | 25 | C-1 | 3 | D-1 | 67 | — — |
| 26 | A-5 | 15 | B-1 | 25 | — | — | D-1 | 60 | — — |
| Comparative Example | | | | | | | | | |
| 13 | A-5 | 0.5* | B-1 | 25 | C-1 | 6 | D-1 | 68.5 | — — |
| 14 | A-5 | 50* | B-1 | 20 | C-1 | 20 | D-1 | 10 | — — |
| 15 | A-5 | 15 | —* | —* | C-1 | 6 | D-1 | 60 | — — |
| 16 | A-3* | 15 | B-1 | 25 | C-1 | 6 | D-1 | 54 | — — |
| 17 | A-5 | 15 | B-2 | 25 | C-1* | 6 | D-2* | 54 | — — |
| 18 | A-5 | 15 | B-2* | 25 | C-1* | 6 | D-1 | 54 | — — |
| 19 | A-5 | 15 | B-1 | 25 | C-1* | 6 | D-2* | 54 | — — |
| 20 | A-5 | 15 | B-3* | 15 | C-1 | 6 | D-1 | 64 | |

Note:
PC-S: Electrostripper (antistatic agent supplied by Kao Corp.)
HES: N,N-dihydroxyethylstearylamine
Each asterisk (*) indicates the value outside the scope of claim in the present invention.

TABLE 6

| | Physical Properties | | | | | | | | | |
|---|---|---|---|---|---|---|---|---|---|---|
| | Transparency | | Tensile properties | | | ¼" Izod | Volume resistivity | | | |
| | Total luminous transmittance (%) | Haze (%) | Yield stress (kg/cm$^2$) | Elongation at break (%) | Flexural modulus (kg/cm$^2$) | impact strength (notched) (kg·cm/cm) | Just after molding (Ω·cm) | After 200 days standing (Ω·cm) | Stress at break (kg/cm$^2$) | Appearance |
| Example | | | | | | | | | | |
| 18 | 88 | 4 | 440 | 46 | 22100 | 15 | $6 \times 10^{11}$ | $4 \times 10^{11}$ | 91 | A |
| 19 | 87 | 5 | 430 | 43 | 22000 | 13 | $8 \times 10^{10}$ | $5 \times 10^{10}$ | 87 | A |
| 20 | 82 | 7 | 370 | 96 | 19000 | 26 | $9 \times 10^9$ | $8 \times 10^9$ | 56 | B |

TABLE 6-continued

| | Transparency | | Tensile properties | | | | Volume resistivity | | | |
|---|---|---|---|---|---|---|---|---|---|---|
| | Total luminous transmittance (%) | Haze (%) | Yield stress (kg/cm²) | Elongation at break (%) | Flexural modulus (kg/cm²) | ¼" Izod impact strength (notched) (kg·cm/cm) | Just after molding (Ω·cm) | After 200 days standing (Ω·cm) | Stress at break (kg/cm²) | Appearance |
| 21 | 76 | 7 | 460 | 57 | 22400 | 12 | $9 \times 10^{11}$ | $8 \times 10^{11}$ | 101 | A |
| 22 | 78 | 6 | 480 | 38 | 23300 | 7 | $7 \times 10^{11}$ | $6 \times 10^{11}$ | 85 | A |
| 23 | 81 | 6 | 360 | 103 | 17500 | 27 | $4 \times 10^{11}$ | $1 \times 10^{11}$ | 50 | A |
| 24 | 77 | 6 | 460 | 59 | 22500 | 12 | $7 \times 10^{12}$ | $6 \times 10^{12}$ | 102 | A |
| 25 | 89 | 3 | 470 | 62 | 22800 | 9 | $3 \times 10^{14}$ | $1 \times 10^{14}$ | 110 | A |
| 26 | 86 | 6 | 440 | 46 | 21500 | 8 | $7 \times 10^{11}$ | $5 \times 10^{11}$ | 30 | A |
| Comparative Example | | | | | | | | | | |
| 13 | 88 | 3 | 460 | 37 | 23100 | 12 | $2 \times 10^{16}$ | $4 \times 10^{15}$ | 114 | A |
| 14 | 79 | 11 | 230 | >200 | 7900 | Not broken | $1 \times 10^{9}$ | $9 \times 10^{8}$ | 22 | B |
| 15 | 88 | 3 | 490 | 8 | 24200 | 3 | $9 \times 10^{11}$ | $8 \times 10^{11}$ | 34 | A |
| 16 | 45 | 51 | 430 | 45 | 22000 | 14 | $5 \times 10^{11}$ | $4 \times 10^{11}$ | 87 | A |
| 17 | 37 | 80 | 430 | 40 | 22100 | 13 | $5 \times 10^{11}$ | $4 \times 10^{11}$ | 86 | A |
| 18 | 42 | 62 | 440 | 41 | 22000 | 13 | $6 \times 10^{11}$ | $4 \times 10^{11}$ | 86 | A |
| 19 | 37 | 77 | 440 | 36 | 22000 | 12 | $6 \times 10^{11}$ | $4 \times 10^{11}$ | 86 | A |
| 20 | 78 | 20 | 400 | 26 | 22300 | 4 | $9 \times 10^{11}$ | $8 \times 10^{11}$ | 72 | C |

From the results shown in Table 6, the following can be seen.

Each of the resin compositions of the present invention (Examples 18 through 26) has an excellent transparency and mechanical properties represented by the impact strength and a low volume resistivity. Furthermore, the resistance value is changed only to a slight extent by surface washing or with the lapse of time and an excellent permanent antistatic effect is exerted.

Namely, the resin composition of the present invention has excellent mechanical properties, permanent antistatic effect and transparency in combination.

Where the content of the polyether-ester amide (A) is lower than 1% by weight (Comparative Example 14, the antistatic effect (resistivity) is poor, and if the content of the polyether-ester amide (A) exceeds 40% by weight, the tensile yield stress and flexural modulus are inferior.

Where the graft copolymerization product (B) is not contained (Comparative Example 16), the impact resistance is poor. Where the polyether-ester amide (A) not containing the diol compound (b) copolymerized as the polyether-ester component is used and where the difference of the refractive index among the polyether-ester amide (A), the graft copolymerization product (B) and the copolymer (D) exceeds 0.02 (Comparative Examples 17 through 20), the transparency is drastically degraded. Where the graft copolymerization product (B) contains the rubbery polymer in an amount exceeding 80 parts (Comparative Example 20), the dispersibility of the graft copolymerization product (B) is poor and the appearance of the molded article is impaired.

We claim:

1. A transparent polyether-ester amide which is formed by copolymerizing:
   (a) an aminocarboxylic acid having at least 6 carbon atoms, a lactam having at least 6 carbon atoms or a salt having at least 6 carbon atoms, which is synthesized from a diamine and a dicarboxylic acid,
   (b) at least one diol compound selected from the group consisting of compounds represented by the following formulae (I) through (III):

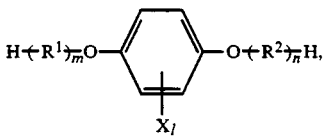
(I)

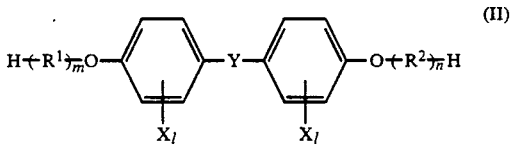
(II)

and

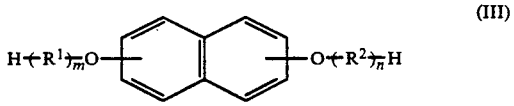
(III)

wherein $R^1$ and $R^2$ independently stand for at least one member selected from the group consisting of an ethylene oxide group and a propylene oxide group, Y stands for a covalent bond, an alkylene group having 1 to 6 carbon atoms, an alkylidene group having 1 to 6 carbon atoms, a cycloalkylidene group having 7 to 17 carbon atoms, an arylalkylidene group having 7 to 17 carbon atoms, O, SO, $SO_2$, CO, S, $CF_2$, $C(CF_3)_2$ or NH, X stands for hydrogen, an alkyl group having 1 to 6 carbon atoms, a halogen, a sulfonic acid or a salt thereof, l is 0 or an integer of from 1 to 4, and m and n stand for an integer of from 1 to 15, (c) at least one diol compound selected from the group consisting of a poly(alkyleneoxide)glycol and a diol represented by the following general formula (IV):

(IV)

wherein $R^3$ stands for an alkylene, alkylidene, cycloalkylidene or arylalkylidene group having 2 to 16 carbon atoms, and (d) a dicarboxylic acid having 4 to 20 carbon atoms, wherein the content of the polyetherester units is 10 to 90% by weight based on the weight of the polyether-ester amide.

2. A transparent polyether-ester amide as set forth in claim 1, wherein the component (a) is ε-caprolactam.

3. A transparent polyether-ester amide as set forth in claim 1, wherein in the diol compound (b) represented by the formulae (I), (II) and (III), at least one of $R^1$ and $R^2$ is an ethylene oxide group.

4. A transparent polyether-ester amide as set forth in claim 1, wherein in the diol compound (b) represented by the formulae (I), (II) and (III), m and n stand for an integer of from 1 to 5.

5. A transparent polyether-ester amide as set forth in claim 1, wherein the diol (b) is an ethylene oxide adduct of bisphenol A or a block copolymer thereof.

6. A transparent polyether-ester amide as set forth in claim 1, wherein the diol (c) is a poly(alkylene oxide)-glycol.

7. A transparent polyether-ester amide as set forth in claim 6, wherein the number average molecular weight of the poly(alkylene oxide)glycol is 200 to 6,000.

8. A transparent polyether-ester amide as set forth in claim 1, wherein the dicarboxylic acid (d) is at least one member selected from the group consisting of terephthalic acid, isophthalic acid, 1,4-cyclohexane-dicarboxylic acid, sebacic acid, adipic acid and dodecanedicarboxylic acid.

9. A transparent polyether-ester amide as set forth in claim 1, wherein the content of the polyamide units is 10 to 80% by weight based on the weight of the polyether-ester amide.

* * * * *

UNITED STATES PATENT AND TRADEMARK OFFICE
CERTIFICATE OF CORRECTION

PATENT NO. : 5,096,995
DATED : March 17, 1992
INVENTOR(S) : Tadao Fukumoto et al It is certified that error appears in the above-identified patent and that said Letters Patent is hereby corrected as shown below:

In Column 5, bridging Lines 46 and 47, please change "1,4-cyclohexanedicarbox-vlic" to --1,4-cyclohexanedicarboxylic--.

Signed and Sealed this

Fifteenth Day of June, 1993

Attest:

MICHAEL K. KIRK

*Attesting Officer*   Acting Commissioner of Patents and Trademarks